United States Patent [19]

Niestegge

[11] Patent Number: 4,922,488
[45] Date of Patent: May 1, 1990

[54] SWITCHING NODE FOR SWITCHING DATA SIGNALS TRANSMITTED IN DATA PACKETS

[75] Inventor: Gerd Niestegge, Munich, Fed. Rep. of Germany

[73] Assignee: Siemens Aktiengesellschaft, Berlin and Munich, Fed. Rep. of Germany

[21] Appl. No.: 269,520

[22] Filed: Nov. 10, 1988

[30] Foreign Application Priority Data

Nov. 11, 1987 [DE] Fed. Rep. of Germany ....... 3738334

[51] Int. Cl.$^5$ ............................................. H04L 11/20
[52] U.S. Cl. ...................................... 370/60; 370/94.1
[58] Field of Search .................. 370/94, 94.1, 60, 60.1, 370/61; 340/825.52

[56] References Cited

U.S. PATENT DOCUMENTS

| | | | |
|---|---|---|---|
| 4,491,945 | 1/1985 | Turner | 370/60 |
| 4,603,416 | 7/1986 | Servel et al. | 370/94 |
| 4,782,478 | 11/1988 | Day, Jr. et al. | 370/60 |

FOREIGN PATENT DOCUMENTS

| | | |
|---|---|---|
| 0113639 | 7/1984 | European Pat. Off. . |
| 2539939 | 7/1984 | France . |
| 86/02510 | 4/1986 | World Int. Prop. O. . |

OTHER PUBLICATIONS

Dieudonne et al.; Switching Techniques for Asynchronous Time Division Multiplexing; Intl. Switching Symp.; Mar. 1987; pp. 367–372.

Boyer et al.; Time Transparency Evaluation of an Asynchronous Time-Division Network; Intl. Switching Symp.; Mar. 1987; pp. 974–978.

Knorpp et al.; Switching Node for Switching Data Signals Transmitted in Data Packets; U.S. Pat. Appln. No.: 07/269,519; filed 11/10/88.

Primary Examiner—Douglas W. Olms
Assistant Examiner—Christopher O. Edwards
Attorney, Agent, or Firm—David N. Caracappa

[57] ABSTRACT

To the switching node belongs at least one coupling element which has n input lines and n output lines optionally connectable to them via a space switch. To each of the input lines a buffer store is assigned in which k data packets are storable and which has m≦k output terminals via which m data packets are simultaneously suppliable to the space switch having m×n input terminals and n output terminals. The storage addresses, under which the data packets to be routed are stored in the individual stores, are stored in accordance with the address signals contained in the data packets and stored in queue buffer stores assigned to the output lines. The queue buffer stores are cyclically accessible by a central control device for making available storage addresses. On the basis of storage addresses made available in such manner the central control device, on the one hand, controls the setting of the space switch and, on the other hand, the output of data packets from the buffer stores.

3 Claims, 4 Drawing Sheets

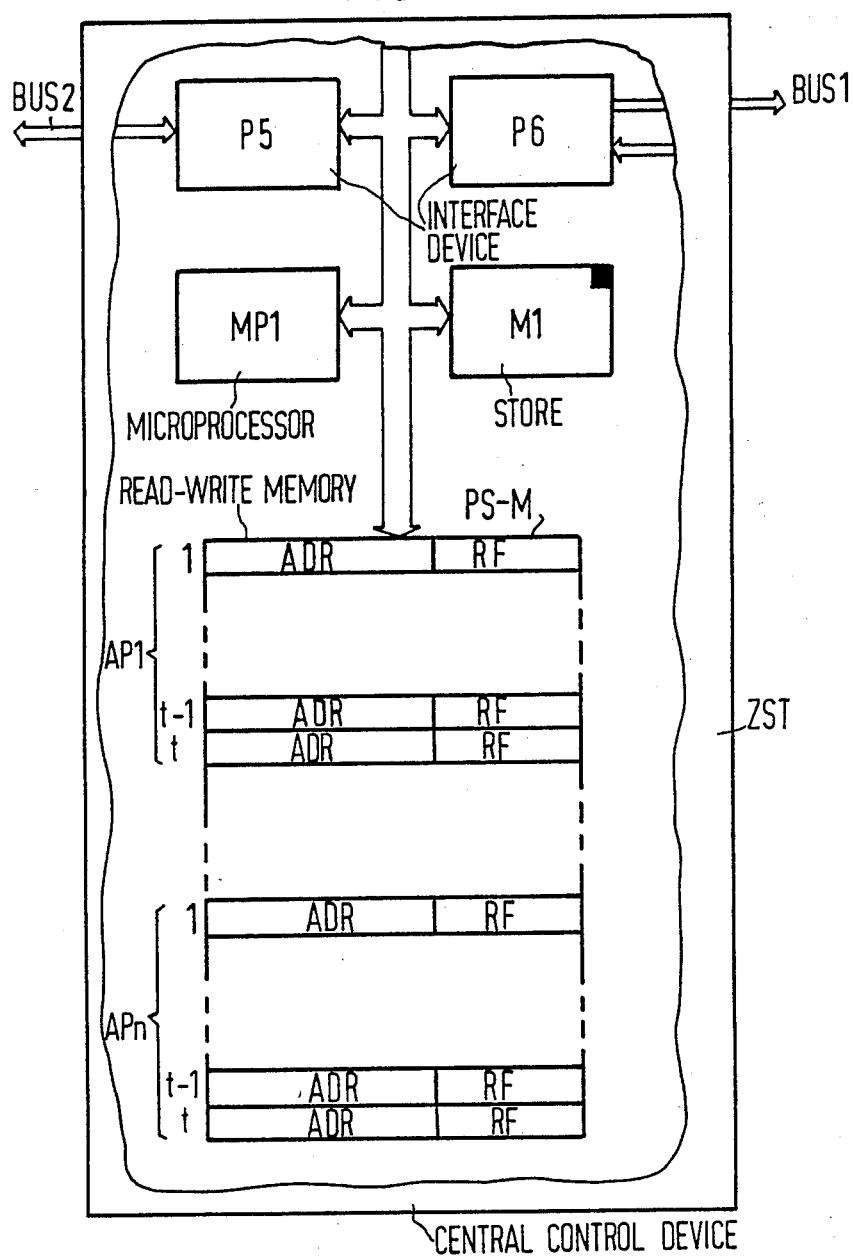

SWITCHING NODE FOR SWITCHING DATA SIGNALS TRANSMITTED IN DATA PACKETS

The invention relates to a switching node for switching data signals transmitted in data packets. The switching node includes at least one coupling element which has n input lines and n output lines selectably coupled to the input lines via a space switch, and a buffer store associated with each of the input lines. The buffer stores may store k data packets occurring on the particular input line are storable before being further routed to the output line identified by the address signals contained in the particular data packet. In addition, the buffer stores have a plurality of m≦k output terminals via which simultaneously m data packets stored in the particular buffer store and to be further routed to m different output output lines are suppliable to a space switch having m×n input terminals and n output terminals.

In known switching nodes, such as are known, for example, from U.S. Pat. No. 4,491,945, issued Jan. 1, 1985 to Turner, the buffer stores associated with the input lines each have only one output terminal. Thus, at any given time only one data packet can be transmitted from a buffer store to the space switch.

In order to improve traffic handling ability, the suggestion has already been made to equip each of the buffer stores provided in a coupling element of a switching node with m output terminals which can be supplied to a space switch having m×n input terminals and n output terminals.

Furthermore, it is already known from ISS 87 Conf. Rec., pages 974 to 978 to place the data packets transmitted via the input lines of a coupling element into intermediate storage in a central store and to deposit the storage addresses of the individual packets in queue stores associated with the output terminals of the coupling element.

It is desirable that in a switching node of the initially stated type, the switching process of data packets stored in the buffer stores of a coupling element can be controlled with low control complexity.

In accordance with principles of the present invention, in a switching node of the initially stated type, a control device belongs to the buffer stores. Upon receiving a data packet in a free storage space of the particular buffer store, the control device makes available a storage address identifying the particular storage area, an identification of the particular buffer store and address signals contained in the particular data packet identifying one of the output lines. A queue buffer store is assigned to each of the output lines. The storage addresses, made available by the control devices may be stored in the queue buffer stores, according to the packet address signals also made available by the control devices. Each of the queue buffer stores is cyclically accessible by a central control device at predetermined time intervals for the output of one storage address. The central control device controls the setting of the space switch on the basis of the storage addresses made available by the queue buffer stores, and supplies the waiting storage addresses to the control devices together with instructions regarding the output terminal of the particular buffer store to be used for the output of a data packet for the control of the output of data packets from the buffer stores.

The invention offers the advantage that, with relatively low control complexity, data packets can be selectively called up by the central control device for a transmission to the n output terminals of the space switch from the individual peripheral buffer stores, with the buffer stores in each instance permitting the simultaneous output of up to m data packets.

In accordance with another aspect of the present invention, the starting position for the cyclical accessing of the queue buffer stores by the central control device shifts in successive time intervals by one queue buffer store.

This offers the advantage that the n output lines of the coupling element are included equally in the transmission of data packets. If the n storage addresses made successively available by the central control device in the course of a cyclical accession identify more than m data packets from one buffer store, then, in the particular time interval, only those output lines can be included in a transmission of data packets which are assigned to the first m queue buffer stores. The number of output lines beyond that are excluded from a transmission of data packets. If a fixed starting position for the cyclical accession of the queue buffer stores were used, this would result in a fixed group of output lines which would be subjected to such an exclusion.

In accordance with yet another aspect of the present invention, if, during the cyclical accession of the queue buffer stores within one time interval, a storage address is output by at least one of the queue buffer stores which identifies a buffer store whose m output terminals are already occupied for the output of data packets, the central control device accesses the particular queue buffer store again to output the storage address next in line. This results in the advantage of increasing the switching capacity of the switching node.

In the drawings:

FIG. 4 is a block diagram of a possible structure of a central control device shown only schematically in FIG. 1.

Figure 1:
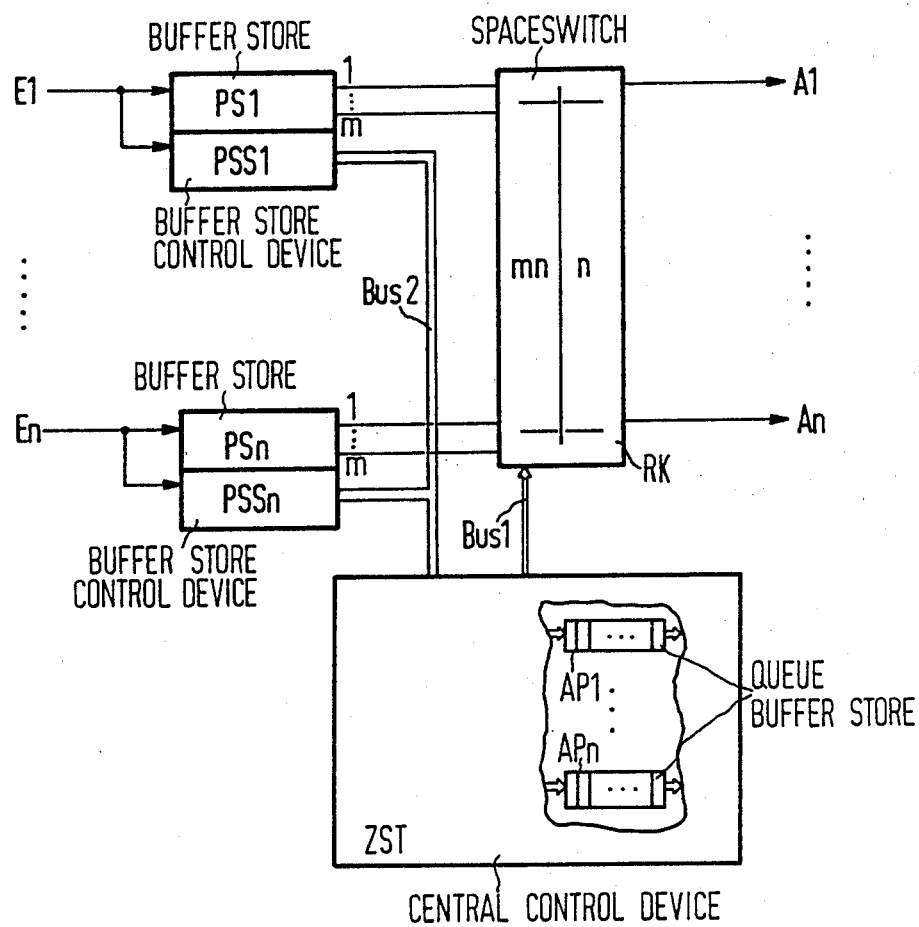
FIG. 1 is a block diagram of a coupling element in which the invention is applied.

In FIG. 1 a coupling element of a switching node is depicted in the form of a block diagram. Only those circuit parts are given which are essential to a comprehension of the present invention.

The coupling element has n input lines E1 to En of which only input lines E1 and En are shown. The input lines may be connected with end devices (not shown) outputting data packets or with output lines of one or several preceding coupling elements (also not shown) of the switching node. Each of the input lines has a buffer store assigned to it in which k data packets are storable. The buffer store assigned to input line E1 to En is denoted by PS1 and PSn respectively. Each of the buffer stores is controllable by a separate buffer store control device connected with the associated input line. The buffer store control device assigned to buffer store PS1 and PSn is denoted by PSS1 and PSSn, respectively.

The buffer stores PS1 to PSn each have m≦k output terminals 1, ..., m which are coupled to a space switch RK. This space switch is equipped with m×n input terminals and n output terminals corresponding to the n buffer stores. The n output terminals are connected to output lines A1 to An which may be connected to end devices (not shown) receiving data packets or an input line of one or several succeeding coupling elements (also not shown) of the switching node.

For setting the space switch RK, a central control device ZST, for example in the form of a microprocessor configuration, is connected to it via a bus line system BUS1. The central control device ZST has n queue buffer stores AP1 to APn which are assigned individually to the output lines. This central control device is, moreover, in connection with said buffer store control devices PSS1 to PSSn via a bus line system BUS2.

In operation, the assumption is made that address signals, associated with virtual connections, are included with the data packets supplied to the coupling element via the individual input lines E1 to En. The address signals designate the output line of the coupling element selected for the particular virtual connection. These data packets may be preprocessed appropriately, possibly, for example, by devices preceding the coupling element. The data packets may be of fixed length.

The data packets supplied, for example, sequentially via the input line E1 to the coupling element are placed into intermediate storage in buffer store PS1 before being routed further via the coupling element. This temporary storage takes place under the control of the buffer store control device PSS1 which, upon the arrival of a data packet, accesses a free storage area of buffer store PS1 for the intermediate storage. After the temporary storage of the data packet, the buffer store control device PSS1 sends the address signals included in this data packet, and the address of the storage area under which the just accepted data packet is stored to the central control device ZST via the bus line system BUS2. This storage area address also identifies the buffer store PS1.

The same processes take place in the remaining buffer stores (PS2 to PSn) and buffer store control devices (PSS2 to PSSn) belonging to the coupling element during the temporary storage of data packets arriving on input lines E2 to En.

The central control device ZST enters the storage area addresses supplied to it into queue buffer stores (AP1 to APn) corresponding to the output terminals A1 to An according to the address signals occurring with each of the storage area address identifying the corresponding one of the output lines A1 to An. These queue buffer stores (first-in-first-out (FIFO) stores) are cyclically accessed at predetermined time intervals which, for example, correspond to the length of time that a data packet requires to be transmitted. The queue buffer stores make available the oldest storage area address stored in them first. On the basis of the storage area addresses made available successively in this way, the central control device ZST sets the space switch RK via the bus line system BUS1. To this end, of the total present $m \times n$ input terminals of the space switch, a maximum of n input terminals are connected, via coupling points, to the output lines A1 to An.

In the here described embodiment, during the cyclical access of the queue buffer stores by the central control device in successive time intervals, the starting queue buffer store accessed during each such a cycle is shifted each time by one queue buffer store. For example, if the preceding cycle started with queue buffer store AP1, then the current cycle starts with queue buffer store AP2.

After setting the space switch RK, the central control device ZST routes the successive selected storage area addresses to the corresponding buffer store control devices, via the bus line system BUS2, during each fixed time interval. A buffer store control device may receive m storage area addresses corresponding to the number of output terminals of the associated buffer store. In accordance with the storage area address or storage area addresses which a buffer store control device receives, the particular buffer store control device accesses the associated buffer store and causes it, through a corresponding number of read commands, to output one or several data packets. The output terminal to be used for each packet is determined by the information which is included with each of the storage area addresses.

During the cyclical query of the queue buffer stores AP1 to APn by the central control device ZST, one of the queue buffer stores may include a storage area address which identifies a buffer store whose m output terminals are already allocated to transmit data packets in response to storage area addresses made available previously. In such a case, in the described embodiment example, the central control device ZST accesses the particular buffer store again to output the storage area address next in line. If this storage area address also identifies a buffer store whose output terminals are already occupied, then the access process is repeated until a storage area address is found which identifies a buffer store which does not have all of its output terminals allocated to transmit data packets.

Previously, the assumption was made that each of the buffer stores PS1 to PSn has $m \leq k$ output terminals. If the number of output terminals per buffer store is selected to be, for example, $m = 2$, then the capacity of the described coupling element to put data packets through relative to a coupling element with buffer stores having only one output terminal can be increased to between 60 to 90%. This throughput capacity may, however, be increased further by increasing the number of output terminals per buffer store.

Figure 2:
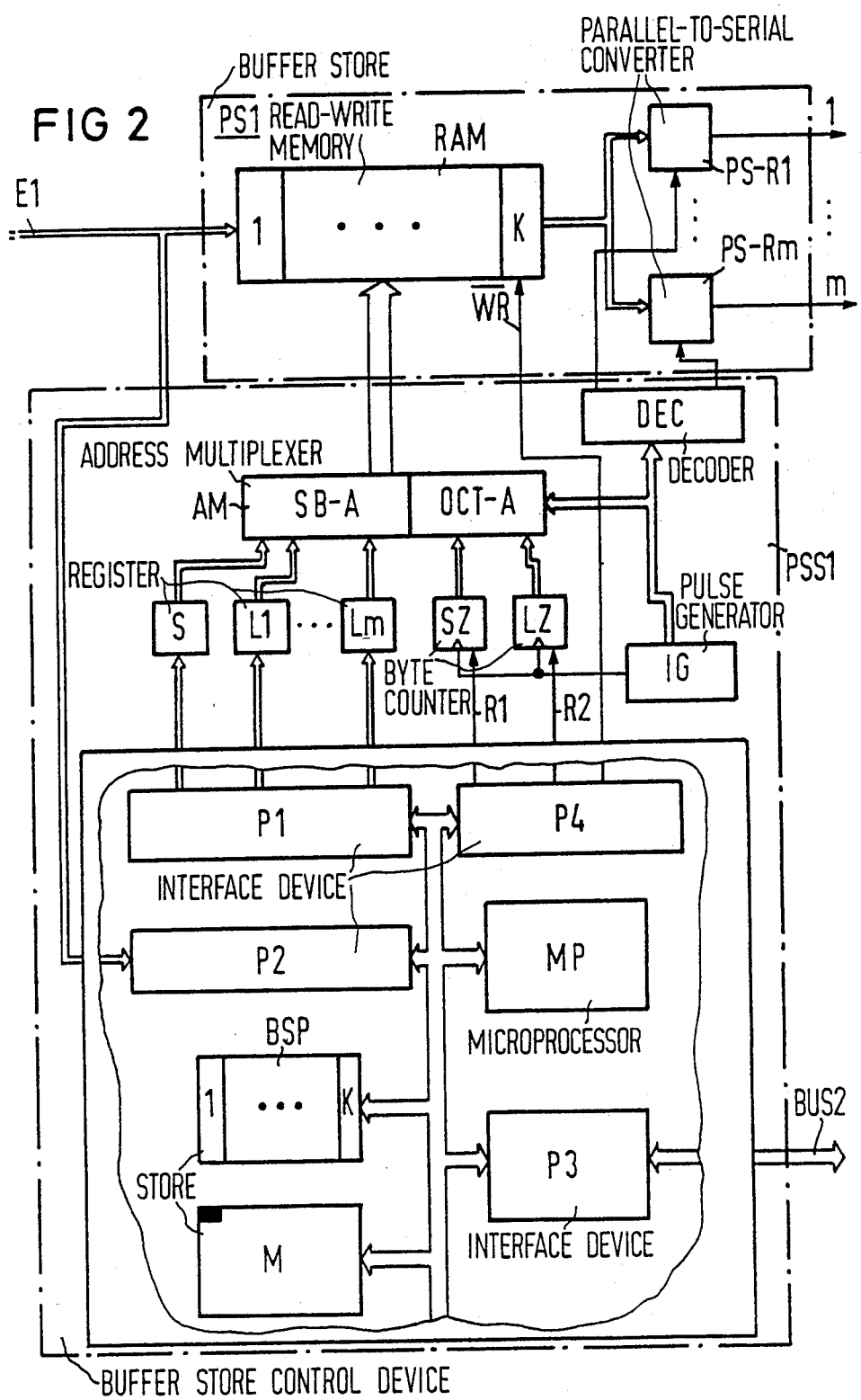
FIG. 2 is a block diagram of a possible structure of a buffer store shown only schematically in FIG. 1 and a buffer store control device connected therewith.

In FIG. 2, using buffer store PS1 and the buffer store control device PSS1 as an example, a possible structure of the buffer store shown in FIG. 1 and the buffer store controls connected therewith are given. It is assumed that, as already mentioned above, the individual data packets are preprocessed by a device preceding the buffer store in such a way that address signals are included with them by which one of the output lines of the coupling element is designated. The input line E1 connected to buffer store PS1, and shown only schematically in FIG. 1, may be implemented as a multibit digital signal line with a plurality of individual lines a part of which is used for the serial transmission of data packets in 8-bit groups called bytes herein, and another part for the transmission of the address signals.

The buffer store PS1 has a read-write random access memory RAM which, on the input side, is connected to the individual lines of the multibit digital signal line E1 carrying the bytes of the data packets. This read-write memory contains a total of k storage areas 1 to k in each of which the bytes of a data packet is storable in successive storage cells. On the output side, m parallel-to-serial converters PS-R1 to PS-Rm are connected to the read-write memory. These registers, which form output terminals 1 to m of buffer store PS1 shown in FIG. 1, individually accept a byte occurring as a result of a read process at the output terminal of the read-write memory RAM in response to a signal at a control input terminal. As will be explained below in fuller detail, in the course of a control cycle one byte can be received by each of the m parallel-to-serial converters. These bytes are subsequently simultaneously further routed serially to the space switch RK.

For controlling the read-write memory RAM, an address multiplexer AM of the buffer store control device PSS1 is connected to the address input terminals of the read-write memory RAM. This address multiplexer is subdivided into two parts SB-A and OCT-A. Connected to part SB-A are a register S for storing a storage area address to be used for storing during write processes and m registers denoted L1 to Lm for storing a storage area address to be used during read processes. Registers L1 to Lm correspond to the output terminals of buffer store PS1 denoted 1 to m. To part OCT-A, in contrast, a byte counter SZ for write processes and a byte counter LZ for read processes are connected. These byte counters each have a counting period corresponding to the number of bytes contained in a data packet and are triggered by a pulse generator IG. This pulse generator, in addition, also supplies control signals to the address multiplexer AM and to a decoder DEC in the course of a control cycle. The latter has m output terminals which are connected to the above stated control input terminals of the parallel-to-serial converters PS-R1 to PS-Rm.

To the buffer control device PSS1 belongs, in addition, a processor PR, which is formed, for example, from a microprocessor configuration. This microprocessor configuration has a microprocessor MP to whose bus system a storage arrangement comprising stores BSP and M is connected as well as four interface devices P1 to P4. Store M functions in known manner as working and program storage, while in the storage cells 1 to k associated with store BSP the actual states of occupancy of storage areas 1 to k of the read-write memory RAM are stored.

To the interface device P1 the input terminals of previously cited registers S and L1 to Lm are connected, while the interface device P2 is connected to the multibit digital signal line E1. Via the interface device P3, the buffer store control device PSS1 is coupled to the bus line system BUS2 shown in FIG. 1. Lastly, to the interface device P4 a line labeled WR as well as reset lines R1 and R2, for the byte counters, are connected. Via line WR write pulses are sent to the read-write memory RAM.

In the previously cited store BSP, the current occupancy of the storage areas of the read-write memory RAM is stored. On the basis of this occupancy, the microprocessor MP determines a nonoccupied storage area in which a data packet occurring subsequently on the multibit digital signal line E1 may be stored. The starting address of this storage area is subsequently sent into register S.

Upon the occurrence of a data packet on multibit digital signal line E1, which is recognized by the microprocessor on the basis of the packet header information, the already cited pulse generator IG sends, via a line configuration S, a control signal to the address multiplexer AM. Through this control signal, the address multiplexer is controlled in such a way that it supplies the previously cited starting address stored in register S and an initial count in byte counter SZ as an address signal to the read-write memory RAM. This initial counter count is set through a reset signal on reset line R1. Furthermore, the microprocessor MP sends, via line WR, write pulses to the read-write memory. On the basis of the occurrence of these write pulses and the incrementing of the byte counter SZ, the individual bytes of the data packet being received are stored sequentially in storage cells of the read-write memory. After the storage of the complete data packet, the store BSP in processor PR is accessed and, in preparation for the reception of the next data packet, a starting address of the next free storage area of the read-write memory RAM is sent into register S. Moreover, as already stated above, the address signals included with the received data packet and the starting address of the storage area of the read-write memory RAM use to store this data packet is transmitted via bus line system BUS2 to the central control device ZST.

The central control device ZST routes, in fixed time intervals, n control data words successively to selected buffer store control devices, via bus line system BUS2, in order to include the particular associated buffer store in a transmission of data packets via the space switch RK. Contained in these control data words are the starting address of that storage area of the read-write memory RAM in which the data block to be transmitted is stored, and information regarding the output terminal of the particular buffer store to be used for the transmission. For example, the buffer store control device PSS1 depicted in FIG. 2 may receive up to m control data words corresponding to the number of output terminals present in the associated buffer store PS1. Upon receiving these control data words the cited starting addresses are sent into the registers L1 to Lm on the basis of the output terminal information.

Subsequently a control cycle is carried out by buffer store control device PSS1 which extends over the duration of the just started time interval and is subdivided into a number of subcycles each having a duration equal to the time required to transmit a data packet containing the maximum number of bytes which may be contained in a data packet. In each of these subcycles, control signals are successively routed via the line configuration S to the address multiplexer AM and the decoder DEC. Through these control signals, the starting addresses stored in registers L1 to Lm and the current count of byte counter LZ are made available as address signals to the read-write memory RAM for reading out bytes in time division multiplex operation. The byte counter LZ assumes its initial count at the beginning of the control cycle through a reset signal on reset line R2. At the end of each subcycle, starting from the initial counter count, the current count is incremented.

In each of the just explained subcycles m bytes are read out from m different data blocks and supplied to the parallel-to-serial converters PS-R1 to PS-Rm. These registers are activated successively via decoder DEC for the reception of a byte. After this byte has been received, a simultaneous serial transmission to space switch RK takes place.

Figure 3:
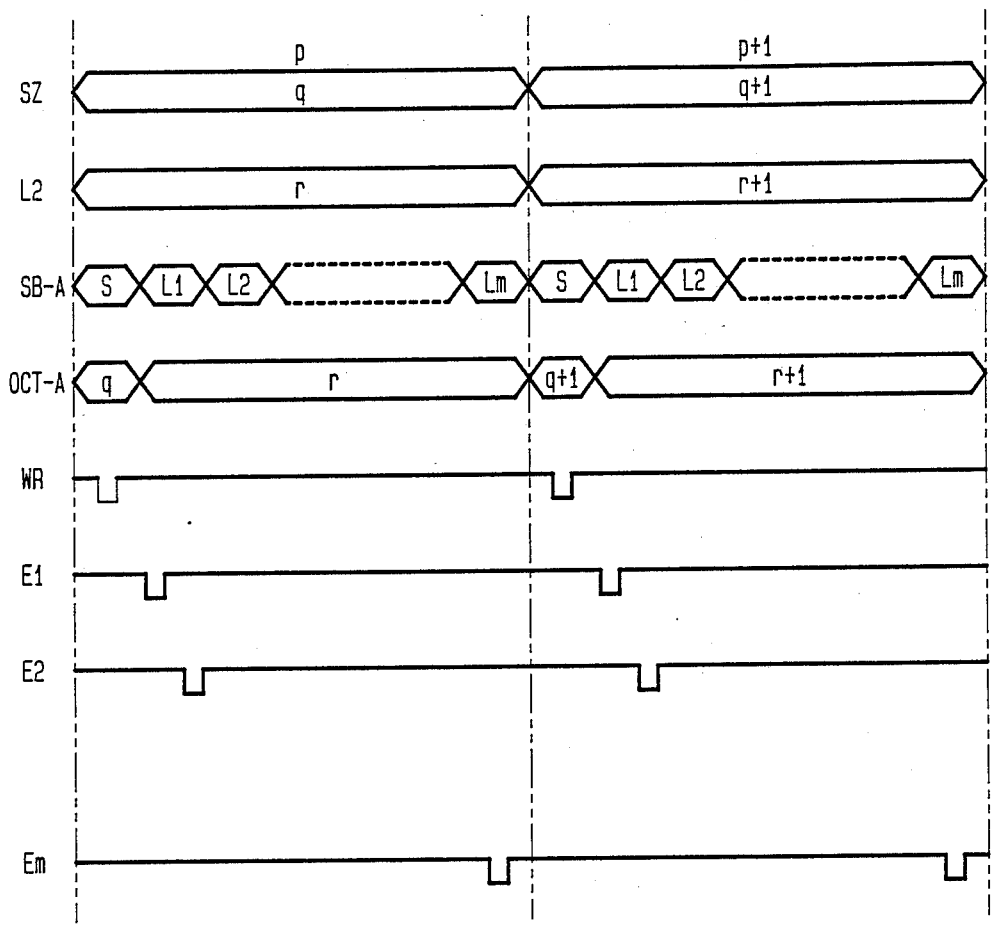
FIG. 3 is a time diagram which will be discussed in the course of the specification.

The remainder of the previously described control cycle is so defined that in each subcycle a byte of a data packet on multibit digital signal line E1 can also be written into the read-write memory RAM. This is also evident in the time diagram depicted in FIG. 3 which illustrates two successive subcycles p and p+1. In FIG. 3, the top line represents the count q and q+1 of byte counter SZ. The next line represents the count r and r+1 of byte counter LZ. The next two lines represent the address signals occurring at the output terminals of parts SB-A and OCT-A, respectively, of the address multiplexer AM. The next line represents the position in time of a write pulse WR. The bottom-most lines represent control signals E1 to Em, respectively, occurring on line configuration S (of FIG. 2).

In FIG. 4 a possible structure of a portion of the central control device ZST (of FIG. 1). In FIG. 4, the central control device has a microprocessor MP1 to whose bus system two interface devices, P5 and P6, and a storage arrangement comprising a store M1 and a read-write memory PS-M are connected. The interface device P5 is provided to allow data exchange with the buffer store control devices PSS1 to PSSn via the bus line system BUS2. The central control device ZST is coupled to the bus line system BUS1, via the interface device P6.

Store M1 functions in known manner as working and program storage. The above cited queue buffer stores AP1 to APn, assigned to output lines 1 to n (of FIG. 1), are allocated to store PS-M. The store PS-M has storage areas AP1 to APn, corresponding to these queue buffer stores, which are accessible in response to the address signals, occurring in the data packets, supplied to the central control device ZST. Each of these storage areas is subdivided into t storage cells, where t may be, for example, defined to be 64 to give a storage capacity to the buffer stores PS1 to PSn of 20 data packets each. These storage cells function for storing the storage area addresses routed from the buffer store control devices and the just cited address signals indicating the location at which the data packets to be transmitted via the particular output line are stored in buffer stores PS1 to PSn. For this storage, which may be carried out for example according to a list of free storage cells present in store M1, a cell part denoted by ADR is provided in each of the storage cells. In a further cell part RF, the sequence of arrival of the individual storage area addresses and, hence, the sequence of the data packets to be transmitted is marked. This sequence is accessed during each write and read of storage area addresses, for example, according to a known concatenation principle.

The microprocessor associated with the central control device ZST selects, in each of successive time intervals, n data packets for further routing to the n output terminals of space switch RK, on the basis of the storage area addresses deposited in the just described store PS-M. As a function of the work-load of the individual output terminals of space switch, up to m data packets stored in the same buffer store can be taken into consideration. After such a selection, a control of the space switch RK in the above given manner and routing of control data words to the possible buffer store control devices takes place.

In conclusion, it may be pointed out that in conjunction with FIG. 4 only an embodiment example for the queue buffer store has been described. These may, however, also be realized in a therefrom variant form.

What I claim is:

1. A switching node for switching data signals transmitted in data packets including address signals, comprising:
    a space switch having a plurality m × n of input terminals and a plurality n of output terminals with m≦n;
    at least one coupling element including a plurality n of input lines and a plurality n of output lines selectably coupled to the input lines via said space switch;
    a plurality of buffer stores being respectively associated with the input lines, in each of which a plurality k of data packets with m≦k occurring on the particular input line are storable before being routed to the output line identified by the address signals contained in the particular data packet, and having a plurality m of output terminals via which, simultaneously, m data packets stored in the particular buffer store and to be routed to m different output lines are suppliable to the space switch;
    a plurality of control devices, respectively associated with the buffer stores, which, upon the reception of a data packet into a free storage space of the particular buffer store, makes available a storage address identifying the particular storage area, the particular buffer store, and the address signals contained in the particular data packet identifying one of the output lines;
    a queue buffer store assigned to the output lines in which, according to the address signals made available by the control devices, the storage addresses occurring together with them can be written, wherein the queue buffer stores are cyclically accessible by an associated central control device in given successive time intervals each time for the output of one storage address; wherein
    the central control device, on the basis of the storage addresses made available by the queue buffer storages, controls the control of the space switch and, for the control of the output of data packets from the possible buffer stores, supplies the available storage addresses and information regarding the output terminal of the particular buffer store to be used for the particular output of a data packet, to the control devices associated with them.

2. The switching node of claim 1, wherein, in successive time intervals, the starting position for the cyclic access of the queue buffer stores by the central control device is shifted by one queue buffer store.

3. The switching node of any one of claims 1 or 2, wherein the central control device, in the event that in the cyclic access of the queue buffer stores from at least one of the queue buffer stores, a storage address is made available which identifies a buffer store whose m output terminals are already occupied for the output of a data packet, accesses the particular queue buffer store again to output the storage address which is next in line.

* * * * *